(12) United States Patent
Davies

(10) Patent No.: US 12,208,881 B2
(45) Date of Patent: Jan. 28, 2025

(54) ROTARY ACTUATION FOR THIN WING APPLICATIONS

(71) Applicant: Goodrich Actuation Systems Limited, Solihull (GB)

(72) Inventor: Stephen Harlow Davies, Shrewsbury (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 0 days.

(21) Appl. No.: 17/718,420

(22) Filed: Apr. 12, 2022

(65) Prior Publication Data
US 2022/0340262 A1    Oct. 27, 2022

(30) Foreign Application Priority Data
Apr. 21, 2021   (EP) .................................... 21275044

(51) Int. Cl.
*B64C 13/34*    (2006.01)
*B64C 13/28*    (2006.01)

(52) U.S. Cl.
CPC ............ *B64C 13/34* (2013.01); *B64C 13/341* (2018.01); *B64C 13/343* (2018.01)

(58) Field of Classification Search
CPC ......... B64C 13/00; B64C 13/28; B64C 13/34; B64C 13/341
See application file for complete search history.

(56) References Cited

U.S. PATENT DOCUMENTS

| 2,966,808 | A | 1/1961 | Grudin |
| 3,146,973 | A | 9/1964 | Haase |
| 4,471,927 | A * | 9/1984 | Rudolph ................... B64C 9/16 244/215 |
| 5,908,177 | A | 1/1999 | Tanaka |
| 6,970,773 | B2 | 11/2005 | Phillips |
| 8,262,030 | B2 | 9/2012 | Phillips |
| 9,995,288 | B2 * | 6/2018 | Safai ........................ F16G 1/20 |
| 10,179,643 | B2 * | 1/2019 | Nfonguem .............. F16H 1/222 |
| 2011/0118076 | A1 | 5/2011 | Lang |
| 2013/0047772 | A1 | 2/2013 | Shafer et al. |

(Continued)

FOREIGN PATENT DOCUMENTS

| CA | 3053826 A1 * | 3/2020 | ............ B64C 13/28 |
| DE | 102017102187 A | 8/2018 | |

OTHER PUBLICATIONS

DE102017102187A1 Abstract.
Extended European Search Report for International Application No. 21275044.2 dated Oct. 15, 2021, 6 pages.

*Primary Examiner* — Philip J Bonzell
*Assistant Examiner* — Anna L. Gordon
(74) *Attorney, Agent, or Firm* — CANTOR COLBURN LLP

(57) ABSTRACT

An actuator system for actuating movement of a control surface of an aircraft wing includes a common input rail connectable to a means for providing movement to said input rail. The system also includes: a plurality of rotary geared actuators "RGAs"; a common output rail connectable to said control surface; wherein each of said plurality of RGAs is connected to said input rail by an individual input clutch and also connected to said output rail by an individual output clutch, and wherein the input clutch functions independently of the output clutch.

12 Claims, 2 Drawing Sheets

(56) References Cited

U.S. PATENT DOCUMENTS

2020/0324879 A1* 10/2020 Trenkle .................. B64D 45/00
2021/0039770 A1*  2/2021 Thomas .................... B64C 9/00
2021/0362835 A1* 11/2021 Eickelberg .............. B64C 9/323

* cited by examiner

SECTION B-B

ROTARY ACTUATION FOR THIN WING APPLICATIONS

CROSS REFERENCE TO RELATED APPLICATIONS

This application claims priority to European Patent Application No. 21275044.2 filed Apr. 21, 2021, the entire contents of which is incorporated herein by reference.

FIELD OF TECHNOLOGY

The examples described herein relate to actuator systems for use in, or with, aircraft wings.

BACKGROUND

Modern aircraft having thin wing configurations require actuation arrangements. Traditionally, since the actuators that are large enough to deliver the required performance to the control surface are too large to fit in the thin wing section, they are usually housed in blisters on the wing.

SUMMARY

An actuator system is described herein for actuating movement of a control surface of an aircraft wing, said system comprising: a common input rail connectable to a means for providing movement to said input rail; a plurality of rotary geared actuators "RGAs"; a common output rail connectable to said control surface; wherein each of said plurality of RGAs is connected to said input rail by an individual input clutch and also connected to said output rail by an individual output clutch, and wherein the input clutch functions independently of the output clutch.

In some of the examples described herein, the input clutch may be set to a threshold torque.

In some of the examples described herein, the threshold torque may exceed a maximum operating torque required by the RGA, with sufficient margin as to ensure the clutch does not slip during normal operation.

In some of the examples described herein, the output clutch may be set to a threshold torque.

In some of the examples described herein, the threshold torque of said output clutch may exceed a maximum operating torque provided by the RGA with sufficient margin as to ensure the clutch does not slip during normal operation.

In some of the examples described herein, the RGA may comprise an input shaft and said input clutch may comprise an input belt which, in use, is rotatable around said input rail and said RGA input shaft.

In some of the examples described herein, the RGA may comprise an output shaft and said output clutch may comprise an output belt which, in use, is rotatable around said RGA output shaft and said output rail.

In some of the examples described herein, the RGA input shaft and said RGA output shaft may be concentric and said RGA input shaft may be positioned within said RGA output shaft.

In some of the examples described herein, said common input rail may be connected to a position sensor.

In some of the examples described herein, the individual input clutch of each of said plurality of said RGAs may be positioned adjacent to the individual input clutch of an adjacent RGA along a longitudinal axis of the common input rail.

In some of the examples described herein, the individual output clutch of each of said plurality of RGAs may be positioned adjacent to the individual output clutch of an adjacent RGA along a longitudinal axis of the output rail.

In some of the examples described herein, said means for providing movement to said common input rail may comprise an electrically driven gearbox and a power distribution unit and said common input rail may be configured to be connectable to said electrically driven gearbox and power distribution unit.

In some of the examples described herein, the drive gearbox may comprise more than one motor and may operate using a clutch drive with jam tolerant bearings.

An aircraft may comprise any of the examples of the new system described herein and the aircraft may comprise a fuselage and the aircraft wing. The means for providing movement to said common input rail may be connected to said input rail and may be provided within said fuselage.

A method of manufacturing an actuator system for actuating movement of a control surface of an aircraft wing is also described herein and comprises providing a common input rail that is connectable to a means for providing power to said input rail, providing a plurality of rotary geared actuators "RGAs"; providing a common output rail connectable to said control surface; connecting each of said plurality of RGAs to said input rail by an individual input clutch and connecting each of said plurality of RGAs to said output rail by an individual output clutch such that the input clutch functions independently of the output clutch.

In the examples wherein the RGA further comprises an input shaft and wherein said input clutch comprises an input belt, the method may further comprise providing said input belt so that, in use, it is rotatable around said input rail and said RGA input shaft.

In the examples wherein the RGA comprises an output shaft and wherein said output clutch comprises an output belt, said method may further comprise the step of providing said output belt such that, in use, it is rotatable around said RGA output shaft and said output rail.

The method may further comprise providing said RGA input shaft and said RGA output shaft are concentric and wherein said RGA input shaft is positioned within said RGA output shaft.

The method may further comprise providing a position sensor connected to said common input rail. In some examples, the position sensor may be located at the end of the input rail that is furthest away from the means for providing power.

The method may further comprise providing a plurality of said input clutches that are positioned adjacent to each other along a longitudinal axis of the common input rail.

The method may further comprise providing a plurality of output clutches positioned adjacent to each other along a longitudinal axis of the output rail.

DETAILED DESCRIPTION

Known actuator systems that are found in modern aircraft having thin wing configurations are usually housed in blisters on the wing. It has been found, however, that this can cause undesirable drag. The examples described herein therefore aim to deal with this issue.

Figure 1:
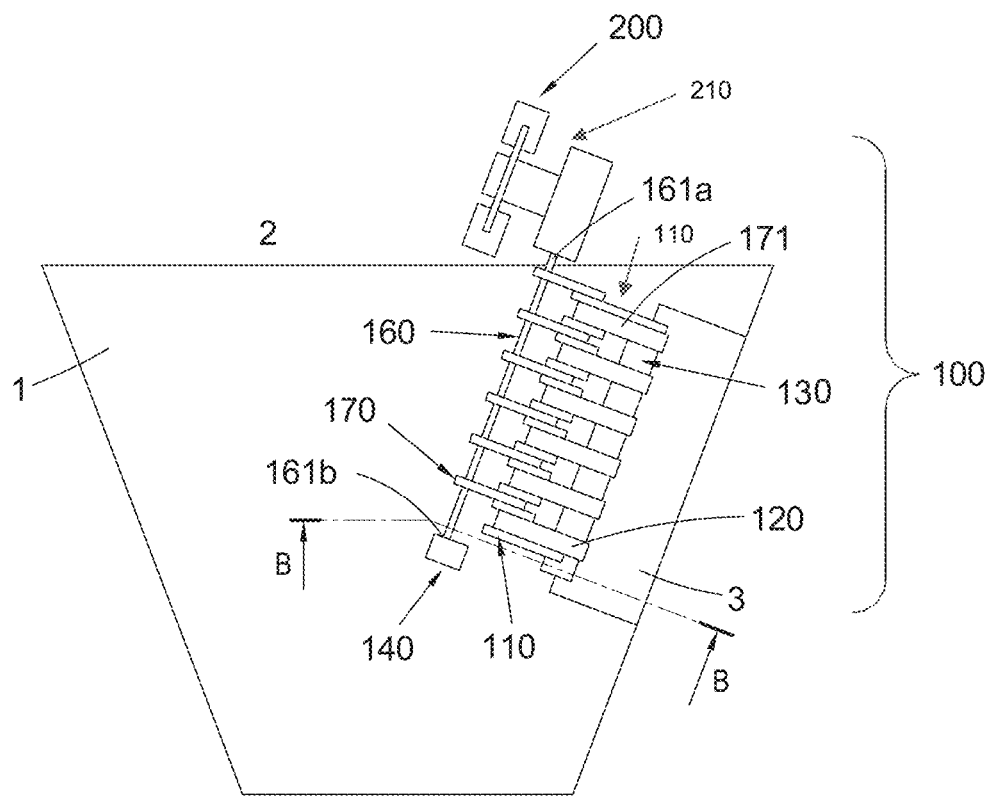
FIG. 1 shows an aircraft wing with an example of a new type of actuator system as described herein installed.
Figure 2:
FIG. 2 depicts a cross-section taken of the wing and actuator system along the line B-B as shown in FIG. 1.

An example of a new type of actuator system for an aircraft wing 1, and in particular, a thin wing configuration, is shown in FIG. 1. The wing is denoted with reference numeral 1 and the fuselage of the aircraft is denoted with reference numeral 2. The moveable flap of the wing is denoted with reference numeral 3.

The new actuator system 100 comprises a plurality of RGAs 110 (e.g. power stage RGAs), a common transmission input rail 160, a plurality of input clutches 170 which comprise a plurality of individual input drive belts 173 and a plurality of output clutches 171 which comprise a plurality of individual output belts 120, a position sensor 140 and a common output rail 130.

The position sensor 140 provides indication of the position of the control surface and is typically positioned at the end of the common transmission input rail 160. It may also be provided in other locations; however, when provided in this location, the overall control system can detect for asymmetry failure modes in the common transmission input rail 160 by comparing the outputs of position sensors provided on each wing.

The actuator system 100 is configured to be connectable or connected to an electrically driven gearbox 200 and power distribution unit (not shown) that in some examples may be located in the fuselage of the aircraft.

The drive gearbox 200 is configured, in use, to drive the common input rail 160, which in turn, via the input clutches and input clutch drive belts, drives the rotary gear assemblies (RGAs) 110 of the actuator system 100, which in turn, drive the output drive belts 120 (such as Kevlar belts) which are connected to the common output rail 130. Since the output rail 130 is connected to the control surface 3 of the aircraft wing, in this way, the control surface may be moved.

The actuator system 100 will now be described in greater detail with reference to the figures. In the example shown in FIG. 1, an aircraft wing 1 is connected to an aircraft fuselage 2 as shown.

Although six RGAs 110 are shown in FIG. 1, other numbers of RGAs 110 could also be used and the examples described herein are not limited to six.

In this example, the drive gearbox 200 is located in the fuselage 2 of the aircraft and this allows for easier access to the drive gearbox 200, such as for maintenance purposes. In some examples, the drive gearbox 200 may comprise two motors and may operate using a clutch drive with jam tolerant bearings. This provides fault tolerance by accommodating a mechanical jam of a bearing enabling the system to continue to operate. The drive gearbox 200 may comprise two electric motor drive channels connected via a speed summing differential gearset 210 and may operate in either an active-standby or active-active mode. Other alternative may also be envisaged.

The actuator system comprises a common input rail 160 which is connected at one end 161*a* to the drive gear box 200 and comprises, at the opposite end 161*b*, a position sensor 140. In use, the input rail 160 extends away from the gear box 200 and fuselage 2 and across the aircraft wing 1 towards its outer edge. The position sensor 140 is typically located at the end of the common input rail 160.

Figure 4:
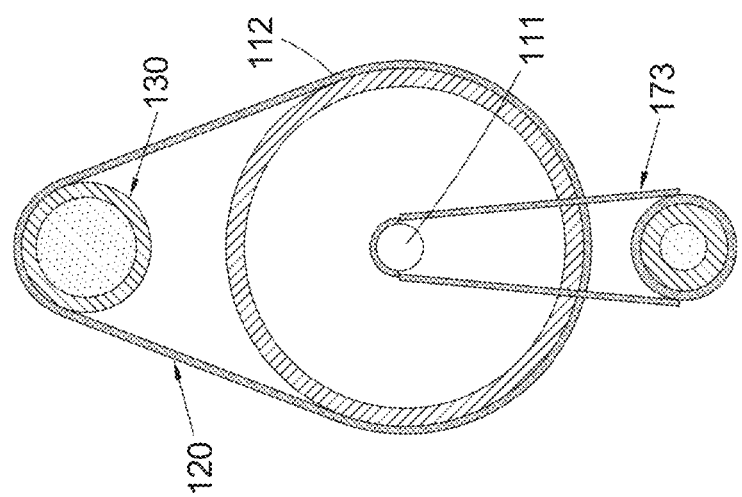
FIG. 4 depicts a detailed view of how the input and output clutch of the system are connected to each other.
Figure 3:
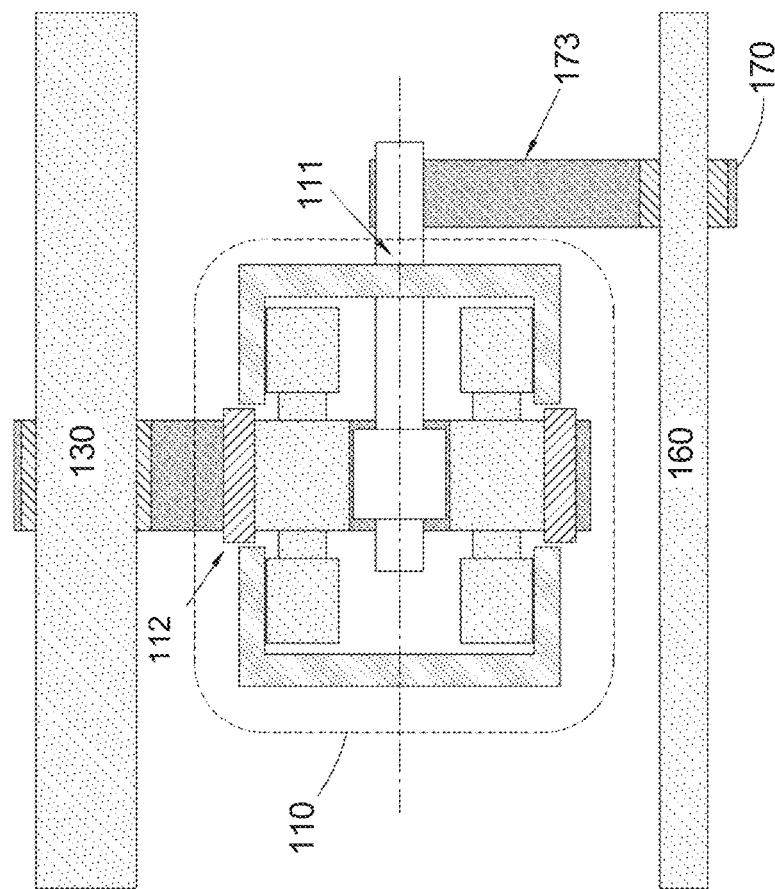
FIG. 3 depicts a more detailed view of an RGA and its connections to the input and output rail.

This input rail 160 may be a common input transmission rail 160 which is movable by the gearbox 200 and provides a synchronous input to each of the RGAs 110 via individual input clutches 170. As shown in FIGS. 3 and 4 each individual input clutch 170 may comprise an input belt 173 which rotates around the input rail 160 as well as an RGA input shaft 111. As can be seen in FIGS. 1 and 3, each RGA 110 works in conjunction with and incorporates a single, individual input clutch 170. In this way, the input rail 160 is connected to the plurality of RGAs 110 via the input belt 173 of each individual input clutch 170. The input clutch 170 may be set to a threshold torque that exceeds the maximum operating torque required by the RGA 110 with sufficient margin as to ensure the clutch does not slip during normal operation.

Each RGA 110 also has a single, individual output clutch set 171 which comprises an output, or drive, belt 120 (such as a Kevlar belt) that is provided at the RGA output. These drive belts 120 rotate around an output drive shaft 112 of the RGA 110 (as shown in FIG. 4) and a common output power rail 130 via the individual output clutch belts 120. The output power rail 130 is connected to the surface of the aircraft wing that is to be controlled (i.e. the control surface, or flap 3). The output clutches 171 also may be set to a threshold torque that exceeds the maximum operating torque provided by the RGA 110 with sufficient margin as to ensure the clutch does not slip during normal operation.

As can be seen in FIG. 4, the RGA input rail 111 around which the input clutch belt 173 of the input clutch 170 rotates, in this example, is concentric with, but provided internally of the output drive shaft 112. Due to this, the input clutch set 170 functions independently to the output clutch set 171.

In known systems, if a single actuator jams, then the control surface 3 will be locked in position and will no longer function as an active flight control surface. In this example, however, if any one of the RGAs 110 jam, then all the adjacent actuators will still continue to function and the control surface 3 will continue to function. This is due to the fact that each actuator 110 is connected at its input and its output by dedicated clutches 170, 171 which are able to move and function independently of each other, and so in the case of a jam the drive gearbox 200 will continue to drive the adjacent actuators 110 and will simultaneously override the input clutch 170 of the jammed actuator. Likewise, the adjacent actuators 110 will continue to drive the output rail 171 and will simultaneously override the output clutch 171 of the jammed actuator.

Thus the system will continue to operate in the event of a single jam of any of the plurality of RGAs 110.

The use of the RGAs 110 in this way allows for flexible configuration of gearing ratios and wing sections. The belt drive configuration also allows for the provision of maximum drive torque radius within the wing section.

The actuator system shown in FIG. 1 is able to exploit its installation space and it is sized and shaped so that it fits in thin wing section.

A method of manufacturing the actuator system 100 described above comprises providing the common input rail 160, the common output rail 130 and the plurality of RGAs and connecting each of the plurality of RGAs to the input rail by an individual input clutch 170 as well as connecting each of the plurality of RGAs 110 to the output rail 130 by an individual output clutch 171 as shown in the figures. The method would comprise connecting these components as described herein such that the input clutch 170 functions independently of the output clutch 171.

The method may further comprise providing the input belt 173 so that, in use, it is rotatable around the input rail 160 and the RGA input shaft 111 as shown in FIG. 4. The method may further comprise providing the output belt (120 so that, in use, it is rotatable around the RGA output shaft 112 and the output rail 160 as also shown in FIG. 4.

The method may also comprise providing the RGA input shaft 111 and the RGA output shaft so that they are concentric and so that the RGA input shaft 111 is positioned within the RGA output shaft 112 as shown in FIG. 4. The method may also comprise providing the position sensor 140 as described above at the outermost end of the input rail.

In addition to the above, the method may comprise positioning the plurality of RGAs such that the individual input clutch 170 of each of the plurality of said RGAs is positioned adjacent to the individual input clutch 170 of an adjacent RGA 110 along a longitudinal axis of the common input rail 160 and such that the individual output clutch 171 of each of the plurality of RGAs is positioned adjacent to the individual output clutch 171 of an adjacent RGA 110 along a longitudinal axis of the output rail 160.

The method may further comprise providing an electrically driven gearbox 200 and a power distribution unit as the means for providing movement to the input rail and connecting the common input rail 160 to the electrically driven gearbox 200 and the power distribution unit.

The invention claimed is:

1. An aircraft comprising:
   a fuselage;
   an aircraft wing having a control surface;
   an actuator system for actuating movement of the control surface of the aircraft wing, said system comprising:
      a common input rail connectable to a means for providing movement to said common input rail;
      a plurality of rotary geared actuators (RGAs); and
      a common output rail connectable to said control surface;
      wherein each of said plurality of RGAs is connected to said input rail by an individual input clutch;
      wherein each of said plurality of RGAs is also connected to said output rail, wherein the connection to the output rail by each of said plurality of RGAs is by an individual output clutch, and wherein the input clutch functions independently of the output clutch;
   wherein said means for providing movement to said common input rail is connected to said input rail and is provided within said fuselage.

2. The aircraft of claim 1, wherein the input clutch is set to a threshold torque.

3. The aircraft of claim 2, wherein said threshold torque exceeds a maximum operating torque required by the RGA, with sufficient margin as to ensure the input clutch does not slip during normal operation.

4. The aircraft of claim 1, wherein the output clutch is set to a threshold torque.

5. The aircraft of claim 4, wherein said threshold torque of the output clutch exceeds a maximum operating torque provided by the RGA with sufficient margin as to ensure the output clutch does not slip during normal operation.

6. The aircraft of claim 1, wherein each RGA comprises an RGA input shaft and wherein said input clutch comprises an input belt which, in use, is rotatable around said input rail and said RGA input shaft.

7. The aircraft of claim 6, wherein said RGA input shaft and said RGA output shaft are concentric and wherein said RGA input shaft is positioned within said RGA output shaft.

8. The aircraft of claim 1, wherein said RGA comprises an RGA output shaft and wherein said output clutch comprises an output belt which, in use, is rotatable around said RGA output shaft and said output rail.

9. The aircraft of claim 1, wherein said common input rail is connected to a position sensor.

10. The aircraft of claim 1, wherein the individual input clutch of each of said plurality of said RGAs is positioned adjacent to the individual input clutch of an adjacent RGA along a longitudinal axis of the common input rail.

11. The aircraft of claim 1, wherein the individual output clutch of each of said plurality of RGAs is positioned adjacent to the individual output clutch of an adjacent RGA along a longitudinal axis of the output rail.

12. The aircraft of claim 1, wherein said means for providing movement to said common input rail comprises an electrically driven gearbox and a power distribution unit and wherein said common input rail is configured to be connectable to said electrically driven gearbox and power distribution unit.

* * * * *